2 Sheets--Sheet 1.
J. A. READ.
Distant Heat Indicators.
No. 142,727. Patented September 9, 1873.
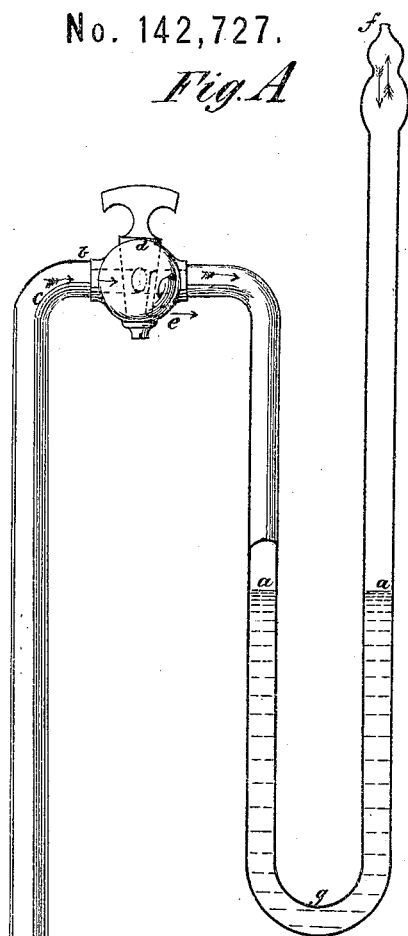
Fig. A
Fig. B
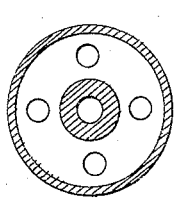
Fig. C
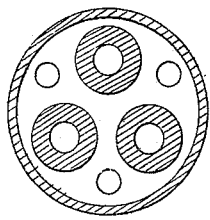
Fig. E
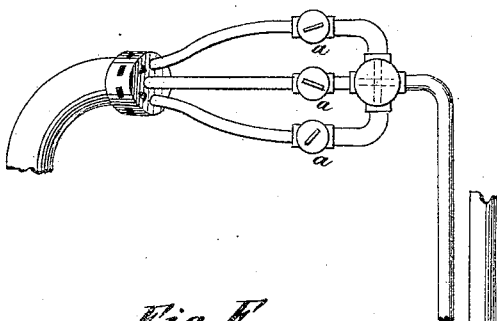
Fig. D
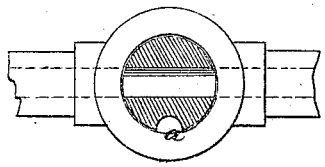
Fig. F
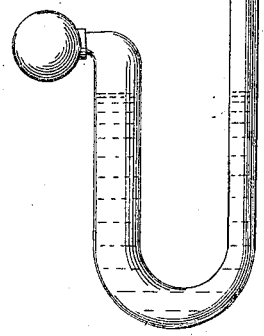
Fig. G
Witnesses.
A. W. Almqvist
W. A. Graham
Inventor:
J. A. Read
per
Attorneys.

2 Sheets--Sheet 2.
J. A. READ.
Distant Heat Indicators.
No. 142,727. Patented September 9, 1873.
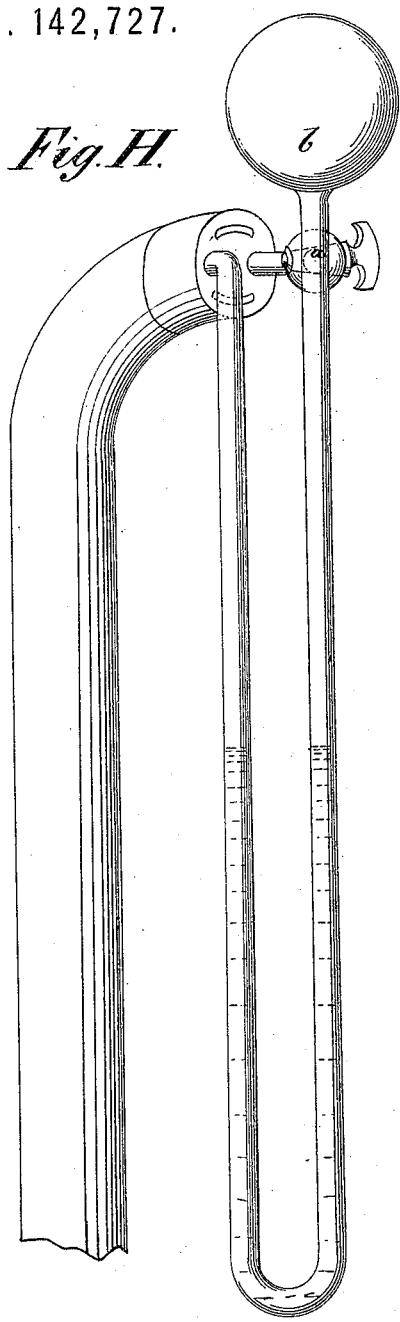
Fig. H.
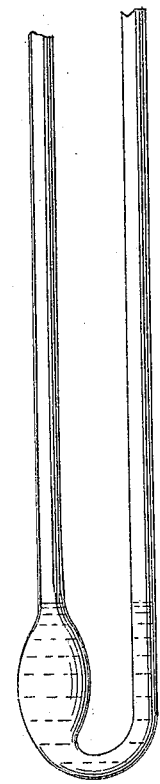
Fig. G
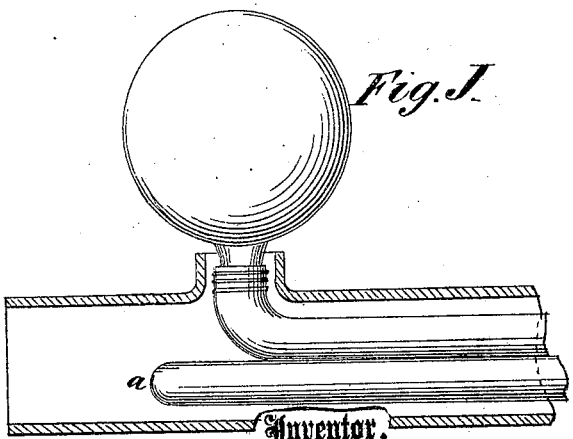
Fig. J.
Fig. I.
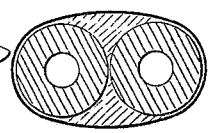
Witnesses.
A. W. Almqvist
W. A. Graham
Inventor.
J. A. Read.
per
Attorneys.
AM. PHOTO-LITHOGRAPHIC CO. N.Y. (OSBORNE'S PROCESS)

UNITED STATES PATENT OFFICE.

JAMES A. READ, OF ENFIELD NEAR SYDNEY, NEW SOUTH WALES.

IMPROVEMENT IN DISTANT-HEAT INDICATORS.

Specification forming part of Letters Patent No. 142,727, dated September 9, 1873; application filed June 15, 1872.

*To all whom it may concern:*

Be it known that I, JAMES ALEXANDER READ, of Enfield near Sydney, in the colony of New South Wales, second clerk in the supreme court of New South Wales, have invented a new and useful machine or instrument for indicating heat at a distance, to be called "Read's Distant-Heat Indicator;" and I do hereby declare that the following is a full and exact description thereof, reference being had to the accompanying drawings, and to the letters of reference marked thereon.

The nature of my invention is as follows: In the cabin, room, or compartment in which it is desired that the heat in the hold of a vessel or in a distant part of any building should be indicated, I place a glass siphon of suitable length. (See Figure A on annexed plates or drawings.) In the said siphon I put a sufficient quantity of sulphuric acid, (colored with cochineal or other suitable substance,) or any suitable liquid which is not liable to evaporate, as shown at points *a a* in Fig. A. This siphon I place against or on a board or plate on which is a graduated scale, (with a movable vernier, if necessary,) to indicate the movements of the liquid and the different degrees of heat in the distant hold or place, accordingly as the liquid is raised in the said siphon. To the said siphon, (with or without the air-cock attached, as hereinafter described,) at point *b*, (shown on Fig. A,) I attach a flexible tube made of india-rubber, gutta-percha, or other suitable material, (see point *c*, Fig. A, on annexed plates or drawings,) of the necessary length, in such a manner that no air from the tube can escape. In ships or vessels this tube may be vulcanized, and in all cases at least one inch in circumference on the outer surface, with a bore to be sufficiently small to contain the least possible volume of air without preventing its free circulation through the same, and must be of sufficient thickness to prevent the external air, if expanded by increased temperature, from so compressing the tube as to render the internal passage smaller, and thereby moving the air within it up or down the internal passage. This tube, for the purposes of protection and insulation, must be inclosed within a larger tube made either of metal, or of vulcanized india-rubber or gutta-percha hose, such vulcanized india-rubber or gutta-percha hose being wired on the inside, or without wire on the inside should such support be unnecessary. This larger or outside tube must be of sufficient size to allow of the passage of air between its inside circumference and the external surface of the inner tube. The projecting edges of this larger or outside tube toward the heat-chamber, hereinafter described, must be brought quite close to the said heat-chamber, and must be completely and effectually closed around the neck of the said heat-chamber, (see point *a*, Fig. B, on annexed plates or drawings,) so as to prevent any air there entering such larger or outside tube. With this object the said end of the outer tube must also be closed. The end of this larger or outside tube toward the said siphon must be brought as close to such siphon as is compatible with the other directions herein contained, and at such end should be closed round the inner tube, leaving apertures through which the external air may enter. (See Fig. C on annexed plates or drawings.) The object of thus allowing the entry of the air at the end where the siphon is placed is that the temperature within the larger or outside tube be unaffected by any increase of temperature external to such tube in any place through which such tube may be passed.

In cases in which the indicator is used only from one hold, room, or compartment to another, or where there is no likelihood of there being any increase of temperature acting upon the tube except that of the hold, room, or compartment, the increasing or increased temperature of which is desired to be indicated, I dispense with the said larger or outside tube. In this latter case the said inner tube must be of greater thickness than in the case of the use of such outside or larger tube. At the end of the inner tube first above described farthest from the siphon I attach a small vessel, bulb, or chamber of glass, of sufficient thickness, or of metal or other suitable material, to contain a volume of air proportioned to the distance such vessel, bulb, or chamber is placed from the indicating-siphon. (See Fig. B on annexed plates or drawings.) This is hereinbefore alluded to as the heat-chamber. The inner tube must at this end be fixed over the neck of the said vessel, bulb, or chamber, so that no air can escape, and at a point within the place where the said outer or larger tube is fixed to the neck of the said bulb, vessel, or chamber. (See point $b$, Fig. B, on annexed plates or drawings. Such vessel, bulb, or chamber must be placed in the hold, room, or compartment the temperature of which it is desired to indicate, the tube, whether within the said outside or larger tube above described or not, being carried or placed so as to secure this object. This vessel, bulb, or chamber should be placed under the deck-covering, the particular hold, or under the ceiling or roof of the particular room or place the heat of which is to be indicated. Such vessel, bulb, or chamber should be left uncovered, so that the same may be easily and at once acted upon by the varying temperature in the hold, room, or place where the same is placed, except that it would be necessary, especially in the case of glass being used for the purpose, that a strong wire net or covering should be placed around it for the purpose of protection from fracture. Such wire net or covering should not be allowed to touch the said vessel, bulb, or chamber, or the india-rubber tube, in any place. The said tube should be so laid and placed that nothing can come in contact with it so as to close the passage of air, or so as to break or injure the vessel, bulb, or chamber. The said vessel, bulb, or chamber should be placed above the tube, so that the heated air rising to the top presses downward upon the air in the tube.

The principle upon which my instrument or appliance acts is the expansion of air in the vessel, bulb, or chamber by the rise of temperature or increasing heat, which, acting upon the air within the tube, and thus ultimately pressing upon and lifting the liquid in the said siphon according to the intensity of the heat, and consequent increasing and increased expansion of air, is confined and unable to escape or expand in any direction except toward such indicating-siphon. The only place in which heat can affect and act upon the air within the tube to any appreciable degree is at the point at which is placed the glass vessel, bulb, or chamber, the first-mentioned or inside tube being, under the directions herein contained, completely insulated, and the temperature without being effectually prevented from affecting the temperature within such insulated tube, and the heat surrounding any part of the tube being prevented from in any appreciable degree affecting or acting upon the air within such insulated tube. As the heat in the hold, room, or place in which is placed the glass or metal vessel, bulb, or chamber increases, the air in such vessel, bulb, or chamber is expanded, and this expanded air will press upon the air in the tube, and the air in the tube thus pressed upon will itself press upon the fluid in the siphon, and the liquid in the indicating-siphon is raised, according to the proportion of such expansion of air and consequent pressure upon the liquid, to the various degrees marked and denoted by the figures at the side of the siphon, and thus the temperature in the place where such vessel, bulb, or chamber is placed is indicated.

I have now described the application and use of my invention in regard to a single tube, and I now proceed to describe the manner of use of my invention in the case of the use of it for indicating and determining the heat prevailing in several distinct holds, rooms, or places, respectively. (See Fig. D, showing the air-cocks horizontally placed at points $a\,a\,a$, on annexed plates or drawings.) For such last-named purpose a separate indicating-siphon, as herein described, with its connected tube, insulated or not, as the case may be, and heat vessel, bulb, or chamber, may be used for each distinct and separate hold, room, or place, the heat of the temperature in which is to be indicated; or a single indicating-siphon, with a separate and distinct tube, insulated or not, as the case may require, for each separate hold, room, or place where the heat is, respectively, intended to be indicated, may be used in the manner herein described. If the latter course is adopted, and the holds, rooms, or places the heat of which severally is to be indicated, are all in the same direction from the room or place in which is placed the indicating-siphon, then one larger insulating-tube surrounding the inner tubes, as above described, may be used, and such several inner tubes, at the end of each of which is placed the vessel, bulb, or chamber above described, may be all placed within such one larger insulating-tube, the same being of such size as may be required, according to the number of tubes within it. (See Fig. E on annexed plates or drawings.) In such case all the ends of the several inner tubes and the end of the larger insulating-tube must be brought as near as practicable to the end of the said siphon, the air being allowed to penetrate only at the end of such larger insulating-tube, in the same manner and for the same purpose as above described, and the several inner tubes must also converge to the end of such larger insulating-tube; and each of such inner tubes must, at some place between the end of the said larger insulating-tube and the end of the said siphon, have a three-way cock, (see point $d$, Fig. A, on annexed plates or drawings,) to prevent the air within such inner tubes expanding and pressing beyond the point at which is such three-way cock when the same is turned, and so pressing upon the liquid within the siphon. The three-way cock is thus constructed: A horizontal bore is made running completely through the plug of the cock, so that, when one end of such bore fits against an opening to be made in the barrel of the cock opposite to the siphon, the other end of such bore will fit against an opening to be made through the barrel to the end of the inner tube, first above described, fixed into such three-way cock; and there is a groove cut in and down the side of the plug from a point at about a quarter-turn from the end of the above-mentioned horizontal bore, which opens toward the siphon, as above described; and such groove is carried to the bottom of the plug, (see point $a$, Fig. F, on annexed plates or drawings,) and there must be also a hole bored through the side of the barrel of the cock immediately under the end of the above-mentioned bore toward the siphon, and so as to be exactly opposite the bottom of the plug. (See point $e$, Fig. A, on the annexed plates or drawings, showing the several pieces of the three-way cock and the points at which the holes are to be bored and end.) When it is desired to ascertain the temperature in any particular hold, room, or place, the three-way cock is so turned that the air in the tube communicating with such hold, room, or place the heat of which is to be indicated, will pass through the horizontal bore running completely through the plug above described; the air-cock to be placed as close as practicable to the top of the column of the liquid in the left arm of the siphon. When it is desired to shut off from the siphon the air coming along such tube from such particular hold, room, or place, and thus to prevent the pressure of the expanded air upon the liquid, and restore the liquid to its equilibrium, then the cock is so turned that the complete horizontal bore is turned away from the opening into the siphon, and the groove in the plug above described is brought against the bore passing through the barrel into the siphon, and, consequently, also against the other hole bored in the said barrel and below the hole to the siphon. The effect of this last-mentioned turn is that the external air, of equal temperature with that entering the orifice at the point $f$ at the other end of the siphon, is admitted through the said lower hole through the barrel of the cock, and passes up the said groove in the plug, and so through the hole through the barrel into the siphon, and the equilibrium of the liquid is restored, the air over the liquid on both sides or ends of the siphon being brought to the same temperature and weight. There must be a stop at the top of the barrel of the said air-cock to prevent the groove coming against the horizontal bore passing into the india-rubber tube. If any tube is carried to any hold, room, or place which is not in such direction as to allow of the tube being carried within the same larger insulating-tube with any other tube or tubes, then such first-mentioned tube must, if the case requires it under the directions hereinbefore contained, be continued and carried within its own separate larger insulating-tube, terminating sufficiently near such three-way cock, as aforesaid, so as to allow of there being placed between the end of such larger insulating-tube and such three-way cock a separate stop cock or tap, as above described.

The right arm of the said siphon must be of suitable length to allow a sufficient column of liquid, when pressed upon by the expanded and expanding air, to rise to a required elevation without passing the curve at the foot of the siphon. (See point $g$, Fig. A, on annexed plates or drawings.) With this object, the diameter of the right arm of the siphon may be less in a certain proportion than the diameter of the left arm of the siphon, and thereby the elevation of the liquid in the right arm will be greater in that proportion than the depression of the liquid in the left arm. Another mode of securing the same object is by making the said siphon with a bulb-expansion at the lower end of the left arm, and near the curve, as shown on Fig. G on annexed plates or drawings. Thus, a sufficient quantity of liquid will always be in the left arm of the siphon to prevent any pressure moving the whole of the liquid beyond the curve at the foot of the siphon. At the end of the siphon at point $f$, Fig. A, on annexed plates or drawings, there must be a small orifice to admit the external air.

In some cases, where circumstances render it necessary that especial care should be taken to provide against the slightest influence the air in a tube may be liable to by reason of any external variations of temperature, I will now describe another instrument by which I get rid of any external variations of temperature acting on the air in the inner tube before described. I attach at point $a$ on Fig. H, on annexed plates or drawings, a short tube, fixed firmly and horizontally into and communicating with the bore in the right-hand arm of the said siphon, as shown in the said last-mentioned figure, at the end of which short horizontal tube farthest from the said siphon I fix a three-way cock of the same description as above described. At the other side of this three-way cock I fix in a horizontal position another short tube, to the opposite end of which I attach an india-rubber tube of the same size, bore, and of equal length as the tube connected at the end with the heat bulb or chamber. This india-rubber tube must be placed with the first or indicating tube united, if necessary, as shown in Fig. I on annexed plates or drawings, in an outer tube, as before described; or, for some situations, the outer tube may be dispensed with, and be carried along as far as the said heat bulb or chamber, at which end the bore of the second tube must be stopped to prevent the air escaping from the same. This is done as is shown at point $a$, Fig. J, on annexed plates or drawings; the outer tube to be closed at the end near the heat bulb or chamber. By this plan the influence of the temperature is always equal on the air in both tubes, the one counterposing the effects of the other, so that the action of the fluid must and can be only acted upon by the expansion of air in the heat bulb or chamber.

To provide an equal resisting force of air acting against the expansion of air in both tubes when the air is confined in the second tube by means of the air-cock, or without air-cock, as hereinafter described, I place a globe at the top upright arm of the siphon, as shown on Fig. H on annexed plates or drawings and marked with the letter *b*, of the same capacity and containing an equal volume of air with the heat bulb or chamber. To prevent the expansion of air within the said globe, marked on said Fig. H, which may be caused by the variations of external temperature, and which expansion may cause pressure within the said globe and down upon the air in the siphon, I attach a three-way cock in the position before described, so that by turning the plug of the said three-way cock so as to bring the groove of the plug of the said cock opposite the said horizontal glass tube on the siphon side, and also opposite the hole in the barrel of the said cock below the said short horizontal tube, all pressure by expansion of air within the said globe is removed.

For some situations, where the changes of temperature are not very great and rapid, the globe is to be covered with india-rubber of sufficient thickness to act as a non-conductor of heat, in which case the air-cock can be dispensed with.

I would strongly recommend the adoption of this method, as shown in Figs. G, H, I, J, respectively, marked on annexed plates or drawings, in cases where each indicator can be used to indicate the heat in distinct localities.

Having now generally described my invention, and the various methods of using and applying the same, I proceed to state what I specially claim as my invention.

I claim as follows:

1. The use of a tube or tubes, one within the other, covered and protected, if necessary, by other tubes or pipes, as hereinbefore particularly described, the inner one to connect the glass chamber or vessel above spoken of and the indicating-siphon, the insulation of the two tubes by means of an air-passage between preventing the action of the heat at any place or point except where such bulb, chamber, or vessel is placed.

2. The application of air-cocks of the form and kind above mentioned, attached to the siphon, releasing the liquid in the same from internal and external atmospheric pressure, and for the purpose of restoring the equilibrium of the liquid within the said indicator or siphon, in the same manner and form above specially mentioned and described.

JAMES A. READ.

Witnesses:
WILLIAM DEANE,
*Notary Public, Sydney.*
WM. F. BRENNAN, *Articled Clerk,*
*75 Elizabeth street, Sydney.*